United States Patent [19]

Geissler et al.

[11] Patent Number: 4,598,312

[45] Date of Patent: Jul. 1, 1986

[54] SECURE VIDEO DISTRIBUTION SYSTEMS

[75] Inventors: Robert G. Geissler, Westfield; Carmine D'Elio, Morganville, both of N.J.

[73] Assignee: Ortech Electronics Inc., Edison, N.J.

[21] Appl. No.: 593,975

[22] Filed: Mar. 27, 1984

[51] Int. Cl.⁴ .................... H04K 1/02; H04N 7/167
[52] U.S. Cl. ........................... 358/118; 358/123; 358/124; 358/122
[58] Field of Search ............... 358/118, 123, 124, 114; 455/30; 179/1.5 M

[56] References Cited

U.S. PATENT DOCUMENTS

| | | |
|---|---|---|
| 3,333,052 | 7/1967 | Kahn . |
| 3,730,980 | 5/1973 | Kirk, Jr. ................ 358/114 |
| 3,859,457 | 1/1975 | Kirk, Jr. ................ 358/114 |
| 3,896,262 | 7/1975 | Hudspeth et al. ........ 358/118 |
| 3,919,462 | 11/1975 | Hartung et al. .......... 358/114 |
| 3,982,062 | 9/1976 | Simons ................. 358/122 |
| 3,999,005 | 12/1976 | Dickinson ............. 358/114 |
| 4,085,422 | 4/1978 | Niwata et al. .......... 358/118 |
| 4,118,669 | 10/1978 | Fung ................... 358/114 |
| 4,215,366 | 7/1980 | Davidson .............. 358/124 |
| 4,232,396 | 11/1980 | Grimes ................. 358/114 |
| 4,245,245 | 1/1981 | Matsumoto et al. ..... 358/122 |
| 4,317,213 | 2/1982 | DiLorenzo ............. 358/114 |
| 4,330,794 | 5/1982 | Sherwood ............. 358/114 |
| 4,367,557 | 1/1983 | Stern et al. ............. 455/4 |

Primary Examiner—S. C. Buczinski
Assistant Examiner—Melissa Koltak
Attorney, Agent, or Firm—Lerner, David, Littenberg, Krumholz & Mentlik

[57] ABSTRACT

A secure cable television distribution system is disclosed for controlling subscriber access to preferred channel information in accordance with the teachings of the instant invention. Premium channel information to be selectively provided to a subscriber is tapped from the transmission medium, modulated, inverted and separated into discrete channel signals. The discrete channel signals are then selectively reintroduced to the transmission medium to effect cancellation of premium channel information which is not to be provided to a predetermined subscriber.

34 Claims, 6 Drawing Figures

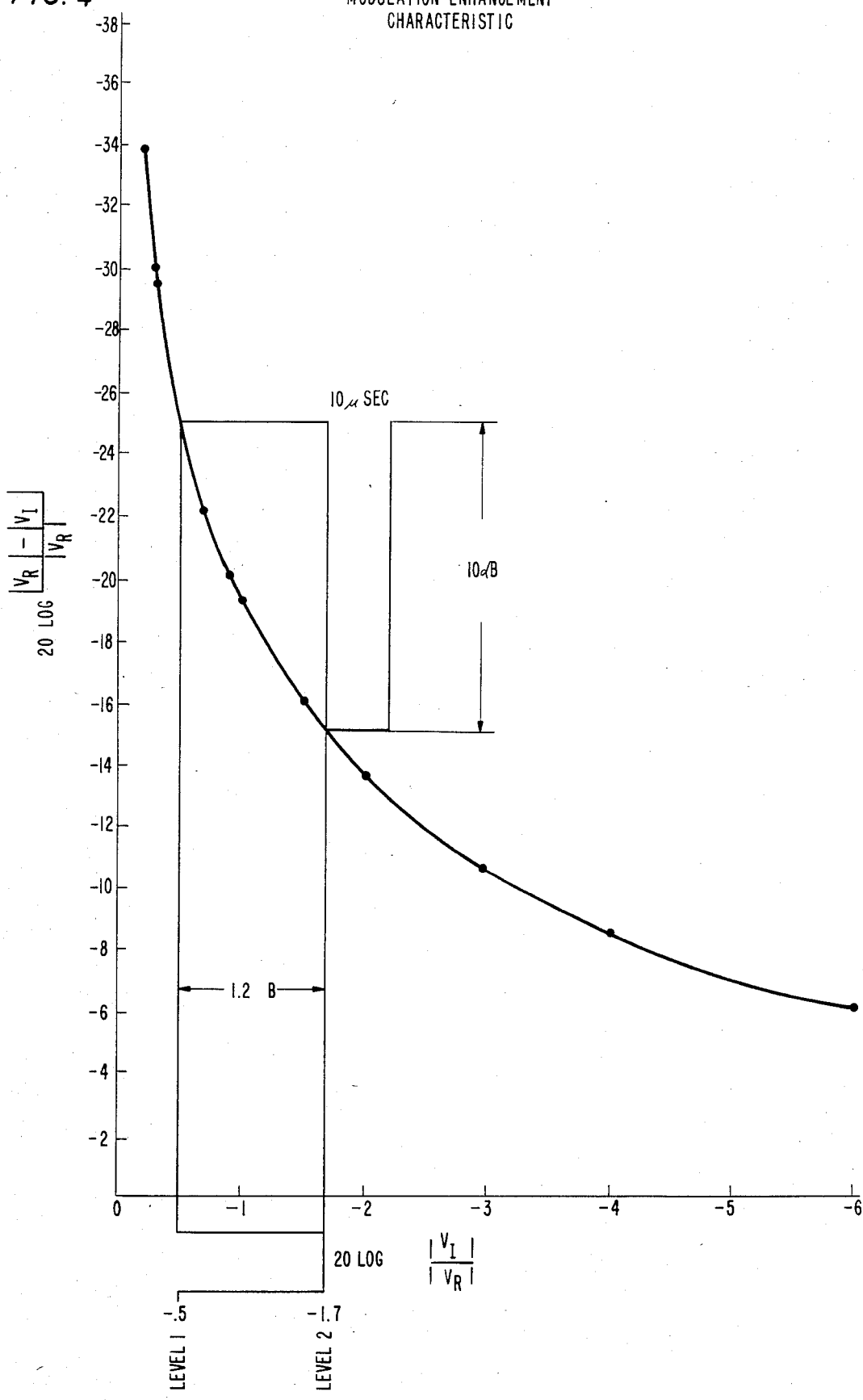
FIG. 4 MODULATION ENHANCEMENT CHARACTERISTIC

SECURE VIDEO DISTRIBUTION SYSTEMS

BACKGROUND OF THE INVENTION

The present invention relates to communication and signal distribution systems and, more particularly, to secure cable television distribution systems which selectively limit access to predetermined channels and maintain the signal quality of channels adjacent to those having limited access.

In cable television distribution systems, it is customary to propagate a selection of basic and premium program signals over a common transmission medium. Access to basic program material is typically provided to all subscribers simply by means of connecting the subscriber's receiver to a converter attached to the cable distribution system. Premium program material, however, is made available for consumption only after special provisions have been made.

Delivery of a strong, undistorted signal of high quality with low equipment and maintenance costs are obvious attributes of cable television distribution systems. Where premium program material is conveyed on a common medium, highly secure and efficient provisions to prevent unauthorized access to premium cable services must also be provided. Such security provisions should exhibit low costs associated with both installation and operation and be controllable from the transmission point to accommodate varying customer demands. In addition, any such security provisions must be operable without a lessening in the quality of the signal delivered and this has been a particular problem with respect to channels adjacent to protected channels and for protected channels delivered to authorized subscribers.

It is known to defeat reception of program material by inserting an interfering carrier within the frequency band of the channel to be blocked during transmission. This interfering carrier may be inserted at the transmission center or the head end and removed at an authorized subscriber's site by filtering techniques or the like, or conversely, selectively inserted at the reception site for unauthorized subscribers.

When an interfering carrier is inserted at the head end, highly precise filtering techniques must be employed for purposes of unblocking a given channel for an authorized subscriber. Such filtering techniques are required since an interfering carrier of this type must be reduced by more than 50 dB to avoid perceptible interference in the reception obtained by an authorized subscriber. Filtering techniques of this type tend to be highly costly, especially in large scale installations servicing a large number of subscribers and it will be apparent that substantial maintenance costs are incurred whenever a subscriber is desirous of changing the nature of the premium channel service purchased.

Conversely, when an interfering carrier is selectively inserted at the reception site, substantial isolation must be provided between adjacent subscribers so that there is no leakage between obstructed and open subscribers. Furthermore, since television signals on a cable may vary 5 to 10 dB, use of such an interfering carrier requires at least 60 dB isolation between subscribers to insure that no leakage between adjacent subscribers occurs. Conventional splitters and the like employed for apportioning cable signals among subscribers do not generally exhibit sufficient isolation for this purpose, and hence, more costly, special purpose devices must be employed.

U.S. Pat. No. 3,859,457 discloses apparatus for selective video suppression which is operative at the subscriber-end on a per subscriber basis. In this reference, a notch filter tuned to the spectrum of a video signal to be selectively inhibited is employed. The filter exhibits relatively little attenuation, however, the signal passed is modulated at a rate exceeding the response capacity of the automatic gain control circuit present in a television receiver. The resulting amplitude modulated signal is essentially unrecoverable in that receiver synchronization, color subcarrier recovery and overall video reception are precluded. In practice, however, it is costly and difficult to provide a filter having a notch deep enough to capture sufficient signal while being sufficiently narrow to preserve adjacent channels. Multiple traps might be cascaded for several channels, however, this results in high insertion loss and would, of course, increase equipment costs which are already high.

It is therefore an object of the present invention to provide improved secure cable television distribution systems which are highly cost effective.

It is an additional object of the present invention to provide secure cable television distribution systems wherein adjacent channel interference is minimized.

It is another object of the present invention to provide secure television distribution systems wherein access to premium channel information at subscriber sites is controlled from the transmission point and is readily variable.

It is a further object of the present invention to provide secure cable television distribution systems wherein premium channel information being conveyed is processed and directly employed to prevent reception at selected subscriber sites.

Various other objects and advantages of the present invention will become clear from the following detailed description of several preferred embodiments thereof and the novel features will be particularly pointed out in conjunction with the claims appended hereto.

SUMMARY OF THE INVENTION

In accordance with the teachings of the present invention, a secure cable television system is disclosed wherein premium channel information to be selectively provided to subscribers is tapped from the transmission medium, modulated, inverted and separated into discrete channel signals, such discrete channel signals are then selectively reintroduced to the transmission medium to effect cancellation of preferred channel information which is not to be provided to a predetermined subscriber.

DESCRIPTION OF THE DRAWINGS

The invention will be more clearly understood by reference to the following detailed description of several exemplary embodiments thereof in conjunction with the accompanying drawings in which:

FIG. 4 is a graphical representation showing the modulation enhancement characteristics obtained in accordance with the teachings of the present invention;

DETAILED DESCRIPTION

Figure 1:
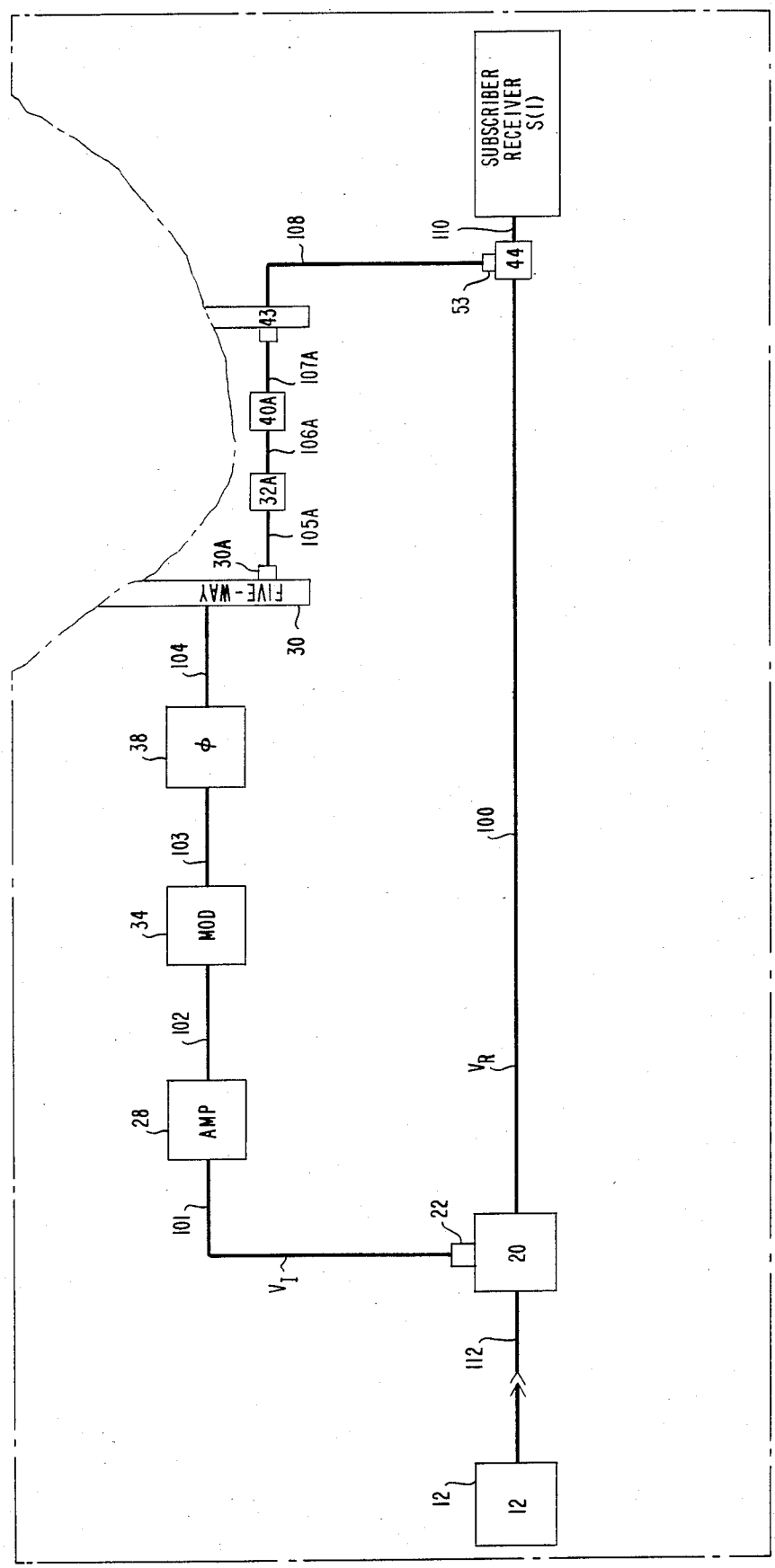
FIG. 1 is a block diagram schematically showing an exemplary embodiment of the present invention.

Referring now to FIG. 1, there is shown a block diagram schematically illustrating an exemplary embodiment of the present invention. The exemplary embodiment of the invention illustrated in FIG. 1 comprises a coupler 20 for receiving basic and premium program signal from the head end 12 of a cable television distribution system and supplying such signals through the transmission line 100 and coupler 44 to a subscriber site indicated by the block S(1), annotated "subscriber receiver". In addition, the signal information supplied from the head end 12 to the coupler 20 is applied through a conductor 101 to a signal processing portion of the instant invention comprising amplifier 28, modulator 34, phase shifter 38, and a splitter combiner network 30-43 made up of a plurality of independent channels only one of which is illustrated in FIG. 1. The output of the splitter combined network 30-43 is supplied through conductor 108 to the coupler 44 where the same is combined with the basic and premium program signal information on conductor 100 and supplied to the subscriber receiver S(1).

The transmission location indicated at the head end by the block 12 forms no part of the instant invention, and hence, should be viewed as entirely conventional. For purposes of fully appreciating the instant invention, it is sufficient to appreciate that the signal information applied from the head end will typically take the form of a mix of program signals which includes basic television channel signals associated with the material provided to any subscriber upon subscription and without payment of any premium fees. In addition, such signal information includes, in a typical circumstance, a plurality of premium channel signals which may be individually selected by a subscriber and obtained only by payment of appropriate fees therefor or the like. Furthermore, as shall also be readily appreciated by those of ordinary skill in the art, the signal information provided at the head end by the transmission station indicated by the block 12 may also include digitally encoded switching information employed to activate or deactivate various switches employed within the embodiments of the instant invention, as shall be described in greater detail below. The signal information thus supplied from the head end on conductor 112 is applied through the coupler 20 as a signal $V_R$ to the transmission line 100 and through the coupler 44 directly to conductor 110 for application to a subscriber's receiver S(1) in the manner well known to those of ordinary skill in the art.

The coupler 20 may take the conventional form of a two-to-one splitter well known to those of ordinary skill in the art. However, the tap indicated by the terminal 22 is preferably a light tap in that the signal obtained therefrom and applied to the conductor 101 is relatively small in magnitude to the extent that there is hardly any derogation of the main or reference signal $V_R$ applied to the transmission line 100. A suitable two-to-one splitter conventionally available for this purpose is available from Antronix, a New Jersey corporation.

The lightly tapped basic and premium program channel signal information obtained from the coupler 20 is applied as a signal $V_I$ through conductor 101 to the amplifier 28. The amplifier 28 may take any of the conventional forms of this well-known class of device known to those of ordinary skill in the art and here acts simply to increase the magnitude of the signal $V_I$ lightly tapped from the main transmission line to that roughly corresponding to the signal supplied on the transmission line 100. For this purpose, it should be noted that the amplifier 28 need not be highly linear or otherwise possess attributes to which extraordinary expense normally attaches. For instance, conventional IC amplifier stages such as two OM-350 integrated amplifier circuits manufactured by Amperex, or the equivalent, may be employed in cascaded configuration exhibiting approximately 18 dB gain per stage, or 36 dB gain overall. This amplifier need not be linear and is characterized as capable of amplifying reasonably high input levels without causing substantial compression. The output of amplifier 28 is applied through conductor 28 to the input of modulator 34.

The modulator 34 may take any of the conventional forms of modulator devices well known to those of ordinary skill in the art. For purposes of the instant embodiment, amplitude modulation is preferred although phase or angle modulation could be used as well and is within the scope of the instant disclosure. Additionally, the amplified signal information applied to the modulator 34 is preferably modulated at a frequency or carrier rate of 15.750 KHz±0.200 KHz so as to correspond to or be slightly off of the sync rate of a conventional television receiver and exhibits a modulation depth typically ranging from approximately one to four decibels. In this regard, operation slightly off of the standard sync rate is preferred. A preferred form of modulator structure, usable in conjunction with various embodiments of the instant invention, is described in detail in connection with FIG. 6. The output of the modulator 34 is supplied through the conductor 103 to the phase shifter 38.

The phase shifter 38 may take the conventional form of an inverter or any of the other well-known forms of this conventional class of device. The function of the phase shifter 38 is to insert an overall 180 degree phase shift to the signal information supplied to the conductor 101 from the coupler 20 so that when such signal is reintroduced at the coupler 44, it exhibits a full 180 degrees phase shift with respect to the signal $V_R$. This means, as will be readily appreciated by those of ordinary skill in the art, that the phase shifter 38 is configured to insert a phase shift corresponding to 180 degrees less any phase shift introduced by any of the other components in the circuit between the couplers 20 and 44. The amplified, modulated and phase shifted signal, thus tapped from the main transmission line by the coupler 20, is applied through the conductor 104 to the splitter 30.

The splitter 30 divides the output of phase shifter 38 on line 104 into a number of parallel circuit branches where the number of such branches corresponds to the number of premium channels to which access is to be controlled. Thus, if there are five premium channels, the splitter 30 will split the signal on conductor 104 into five branches. Each branch is then further processed on the basis of the premium channel associated therewith to create an access limiting signal representative of that assigned premium channel. This signal can then be selectively mixed with the transmitted program signal containing corresponding premium channel signals at a subscriber receiver to defeat unauthorized reception of selected premium channels.

For ease of disclosure, only one such parallel circuit branch A is shown in FIG. 1, although it will be understood that any number of such branches may be created, one for each premium channel signal transmitted, and that all such branches will be alike in construction and function. Accordingly, if there are five premium channels, five parallel branches will be established respectively coupled between respective outputs and inputs of splitter 30 and combiner 43, respectively.

Splitter 30 and combiner 43, as well as all couplers and splitters described herein, may be constructed in a conventional manner, for instance, ferrite type splitters and combiners well known to those of ordinary skill in the art are preferably employed. Those of ordinary skill in the art will appreciate that any signal split is divided into a plurality of signals equal in content, voltage, phase and amplitude. It will be further understood that the channel branch shown in FIG. 1 is referred to as the "channel A" branch, inasmuch as it will be tuned to pass only a premium signal corresponding to channel A, however, channels B-N could be present as well.

The channel A branch is formed by the output of the splitter 30A, a narrow pass filter 32A, and switch 40A. The output of the splitter, as aforesaid, will comprise the amplified, modulated and phase shifted signal tapped from the main transmission line 100 which contains all of the basic channel information, as well as each of the premium channel signals. This output is applied to the input of the narrow band filter 32A. The narrow band filter 32A is a band pass filter having a narrowly defined passband centered on the frequency of the premium channel associated with branch A. The bandwidth of this filter is preferably on the order of 100 KHz to 1 MHz and should be clearly less than 6 MHz. This filter, as will be readily appreciated by those of ordinary skill in the art, may take the form of a surface acoustic wave resonator (saw filter) or any other filter configuration capable of yielding a very narrowly defined passband. The narrow bandpass filter 32A acts, as will be appreciated by those of ordinary skill in the art, to restrict the signal information propagated in the A branch to that associated only with the premium signal assigned to this branch. All other channel information, both basic and premium, is rejected thereby. The output of the narrow band filter 32A is applied through the conductor 106A to the input of the switch 40A. The switch 40A may take any conventional form of manual or electronic switch capable of selectively applying the output on conductor 106A to the input of the combiner 43 at terminal 43A. In simplified embodiments of the instant invention, switch 40A may be manually actuated; however, in larger embodiments of the instant invention, as illustrated for instance in connection with FIG. 5, the switch 40A would take the form of a logic-controlled and actuated switch which is responsive to digital information transmitted on the cable distribution system to selectively apply the output of the narrow pass filter 32A to the input of the combiner 43A.

The output of the switch 40A is applied through the conductor 107A to the input terminal 43A of the combiner 43. The combiner 43, as will now be appreciated by those of ordinary skill in the art, is a conventional device which acts as the functional compliment of the splitter 30 to combine access limiting signals from each of the branches A-N into a combined signal and supply the same through the conductor 108 to the coupler 44. Those of ordinary skill in the art will further appreciate that only channel information associated with branches A-N having the switch 40A-40N in a closed position will supply information to the combiner 43 and this information, in effect, is employed within the coupler 44 to substantially cancel predetermined premium channel signal information associated with premium channels which are not to be provided to the subscriber S(1). The coupler 44, as will be appreciated by those of ordinary skill in the art, is a conventional coupler which acts to combine signal information provided at the output of the combiner 43 on conductor 108 with the basic and premium channel information $V_R$ already present on the transmission line 100. This information, as combined by the coupler 44, is then provided through the conductor 110 to an individual subscriber S(1).

In operation of the above simplified embodiment shown in FIG. 1, program material, comprising a plurality of basic and premium television channels, each channel having a bandwidth of approximately 6 MHz and an assigned carrier frequency in the range of 50 to 900 MHz, is transmitted as signal voltage $V_R$ on line 100 from line 112 at the head end 12 via coupler 20, coupler 44 and line 110 to subscriber station S(1). A portion of this signal is lightly tapped by coupler 20 to create a representative signal. This representative signal includes each premium channel signal transmitted from the head end, as well as each basic channel signal and digitally coded switching information which may be present. Signal $V_I$ is applied through line 101 to amplifier 28 and amplified such that $V_I$ approximately equals $V_R$. This amplified signal is applied through line 102 to the modulator 34. The modulator 34 acts to modulate signal $V_I$ at an approximate rate of 15.750 KHz, which corresponds to the horizontal line synchronization rate of a standard television receiver or at an off sync rate of 15.650 KHz or 15.850 KHz.

The modulated signal is connected through conductor 103 to phase shifter 38, which imparts an overall phase shift of approximately 180 degrees into the signal being processed in this loop, as aforesaid. Thus it will be understood that signal $V_I$ exiting phase shifter 38 is shifted so that the signal $V_I$ exiting combiner 43 is approximately 180 degrees out of phase with signal $V_R$ entering coupler 44.

This phase-shifted signal $V_I$ is applied to splitter 30 through conductor 104 and is split such that signals which are equal in content, voltage, phase and amplitude, are outputted from each of the outputs 30A-30N of splitter 30. Only output 30A relating to the channel A branch is shown in FIG. 1, although it will now be understood that if there were five premium channels to be controlled, five branches would have been created. In any event, as seen in FIG. 1, an amplified, modulated and phase-shifted signal $V_I$ is split by splitter 30, where a representative signal $V_I$ will appear at output 30A. Signal $V_I$ is applied from splitter output 30A to filter 32A through line 105A. The filter 32A preferably has a pass band of 100 KHz, is tuned to the carrier frequency of channel A, a selected premium channel, and ideally will pass only a modulated, phase shifted channel A carrier and sidebands. Similarly, as should now be clear, respective filters 32B–32N of all other parallel branches, although not shown in FIG. 1, will pass similar corresponding signals according to the carrier frequency of the premium channels to which those filters are respectively assigned.

The channel A signal output by filter 32A is coupled through conductor 106A to switch 40A. Switch 40A will be placed in an open condition if the subscriber is to receive the channel A premium signal and in a closed condition if such signal is not to be provided. If switch 40A is in a closed condition, the channel A signal is applied through conductor 107A and combiner 43, line 108, tap 53 to coupler 44. In coupler 44, this signal mixes with signal $V_R$ and precludes satisfactory reception of channel A at station S(1). Alternatively, when switch 40A is open channel A premium signal information is satisfactorily received at station S(1).

Those of ordinary skill in the art will now appreciate that the access limiting signals generated according to the teachings of the present invention have several features. The lightly tapped signal has been phase shifted 180 degrees, it has been modulated at a rate of 15.750 KHz or at an off frequency rate varying by ±200 Hz, and the amplitude of $V_I$ approximately equals $V_R$. Thus when a particular channel access limiting signal is applied to coupler 44 and mixed with the $V_R$ signal, the particular premium channel signal information will tend to cancel and so reduce the signal-to-noise ratio of that particular channel as to foreclose reception. Additionally, false sync pulses associated with the modulated access limiting signal prevent proper synchronization by the receiver on any portion of the particular premium channel carrier.

Figure 2:
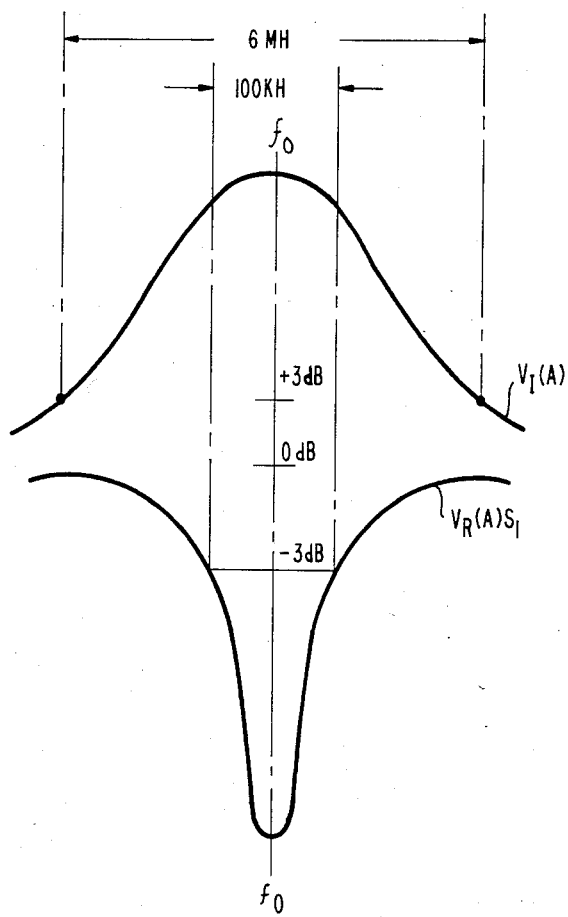
FIG. 2 is a graphical representation illustrating an exemplary preferred channel signal $V_{R(A)}$ at a subscriber site and an exemplary access limiting signal $V_{I(A)}$ therefor obtained in accordance with the teachings of the present invention, each of said signals illustrated as a function of amplitude and frequency.

The signal processing occurring within the cable distribution system according to the present invention is further described in connection with FIGS. 2–4. Referring now to FIG. 2, there is shown a graphical representation illustrating an exemplary preferred channel signal $V_{R(A)}$ as present at the subscriber site and an exemplary access limiting signal $V_{I(A)}$ therefor obtained in accordance with the teachings of the present invention. Each of the signals $V_{R(A)}$ and $V_{I(A)}$ are plotted as a function of amplitude and frequency. More specifically, in FIG. 2, a signal designated $V_{R(A)}$ corresponding to an exemplary channel A premium channel signal component of signal $V_R$ is illustrated as the same appears at the subscriber site after being combined with signal $V_{I(A)}$. Signal $V_{R(A)}$ has a carrier center frequency $f_O$, which is within a range of 50 to 900 MHz. Signal $V_{R(A)}$ has a bandwidth of 6 MHz, and is centered at frequency $f_O$. The sharply defined notch portion of the signal $V_{R(A)}$, however, will reside between 100 KHz to 1 MHz. Also shown in FIG. 2 is signal $V_{I(A)}$ corresponding to the channel A signal generated in accordance with the teachings of the present invention. Signal $V_{I(A)}$ represents signal $V_I$ limited by filter 32A to a bandspread of 100 KHz to 3 MHz having a center frequency $f_O$, the center frequency of filter 32A and the A premium channel.

When signals $V_{R(A)}$ and $V_{I(A)}$ are mixed at coupler 44, signal cancellation will result at $f_O$ and will tend to occur with varying degrees of efficiency. More particularly, a detailed inspection of FIG. 2 will readily reveal that the access limiting signal $V_{I(A)}$ will substantially cancel the premium channel component $V_{R(A)}$ at the subscriber site associated therewith for the portions of the curve within 50 KHz on either side of the center frequency $f_O$ thereof, as indicated by the 3 dB down indication associated therewith. In practice, these signals will vary in phase and amplitude from time to time, however, the degree of cancellation of the channel A picture carrier will be such that usable reception is essentially foreclosed. Thus, the signal-to-noise ratio of the channel A signal at the subscriber receiver S(1) will be greatly diminished and will result in negligible reception of that channel signal.

Figure 3:
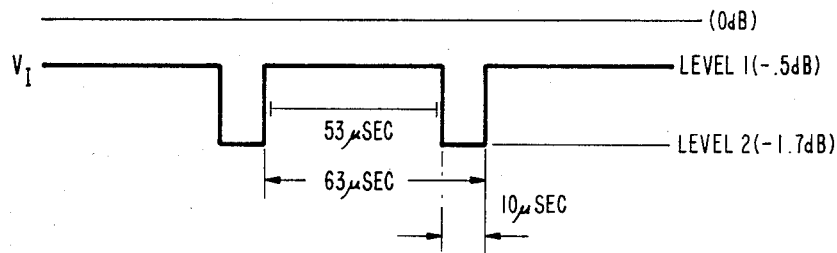
FIG. 3 is a graphical representation of a modulated access limiting signal $V_I$ in accordance with a preferred embodiment of the present invention.

Referring now to FIG. 3, there is shown a graphical representation of a modulated access limiting signal $V_I$ in accordance with a preferred embodiment of the present invention. Signal $V_I$ is modulated at 15.750 KHz or at an off frequency rate as aforesaid. Specifically, signal $V_I$ is shown as a squarewave output of modulator 34 and varies between levels 1 and 2, in the manner indicated in FIG. 3. The signal has a period on the order of 63 microseconds here corresponding to a frequency of 15.750 KHz and an exemplary modulation depth of approximately 1.2 dB. The nature of the modulator waveform $V_I$ is such that the same initially resides at level 1 or −0.5 dB for a duration of 53 microseconds followed by a transition to level 2 or −1.7 dB for an interval of 10 microseconds. Those of ordinary skill in the art will appreciate that the exemplary values set forth in connection with FIG. 3 are readily variable to suit design preferences.

Referring now to FIG. 4, there is shown a graphical representation illustrating the modulation enhancement characteristics obtained in accordance with the teachings of the present invention. More particularly, in FIG. 4, the decibel equivalents of the two voltage levels, V1 and V2, as ratios to the signal $V_R$ are compared to demonstrate the manner in which the modulation of the signal $V_I$ impacts signal cancellation and adjacent subscribers' isolation requirements. The voltage ratios illustrated are based upon the values of $V_R$ and $V_I$ where the ratio of a logarithmic function of $V_I$ to $V_R$ is plotted along the abscissa and the logarithmic function of signal difference between the value $V_R$ minus $V_I$ to the value $V_R$ is set forth along the ordinate. The resulting curve represents the relation between the relative levels of the signals at the receiver as presented to the vertical sync circuit as a result of modulation of the signal $V_I$ between levels 1 and 2.

Also depicted in FIG. 4 is a representation of one cycle of the modulated signal $V_I$ of FIG. 3. It will be recalled that $V_I$ is modulated between level 1 (−5 dB) and level 2 (−1.7 dB) at the line sync rate of 15.750 KHz or at an off frequency value. Accordingly, when signal $V_{I(A)}$ is modulated 1.2 dB to level 2 for 10 microseconds, a −15 dB signal will be applied to the synchronizer circuit of the subscriber receiver S(1) tuned to channel A. When signal $V_{I(A)}$ returns to level 1 (−0.5 dB) for 53 microseconds, a −25 dB signal will be applied to the synchronizer. Thus, once every 63 microseconds the receiver S(1) sync circuit will be pulsed from −15 dB to −25 dB. This means that a 10 microsecond, 10 decibel pulse at a rate of 15.750 KHz will be applied to the synchronizer circuit at receiver S(1). Such a signal will appear as a line sync signal to the vertical synchronizing circuit within a receiver, and hence, synchronization with this signal will be attempted. This will effectively defeat picture synchronization for this channel and wholly obscure reception for the preferred channel information being discussed.

As seen in FIG. 4, exemplary modulation of 1.2 dB at a rate of 15.750 KHz creates a false sync pulse having an excursion depth of 10 dB. Thus, FIG. 4 demonstrates an 8.8 dB signal enhancement obtained through modulation of the access limiting signal. Under these circumstances, those of ordinary skill in the art will appreciate that where the $V_J$ signal is amplified to a value to correspond to the magnitude of $V_R$, the signal enhancement obtained through modulation at the sync rate will permit substantial leeway in the amount of isolation required by the switches 40A or, as described below, the switches $40_{A(1)}$–$40_{E(4)}$ and the four-way splitter 54 in FIG. 5. For example, with modulation of 1.2 dB, sidebands of approximately 30 dB will occur which means that only 30 dB's of isolation will be required from the switches and splitter described above. This is readily available from devices in the marketplace; however, absent such signal enhancement, 45 dB's of isolation would be needed with a value of 60 dB's required to insure no residual jamming signal presence to an enabled subscriber. Conventionally available switches and splitters simply do not manifest these higher levels of isolation.

Figure 5:
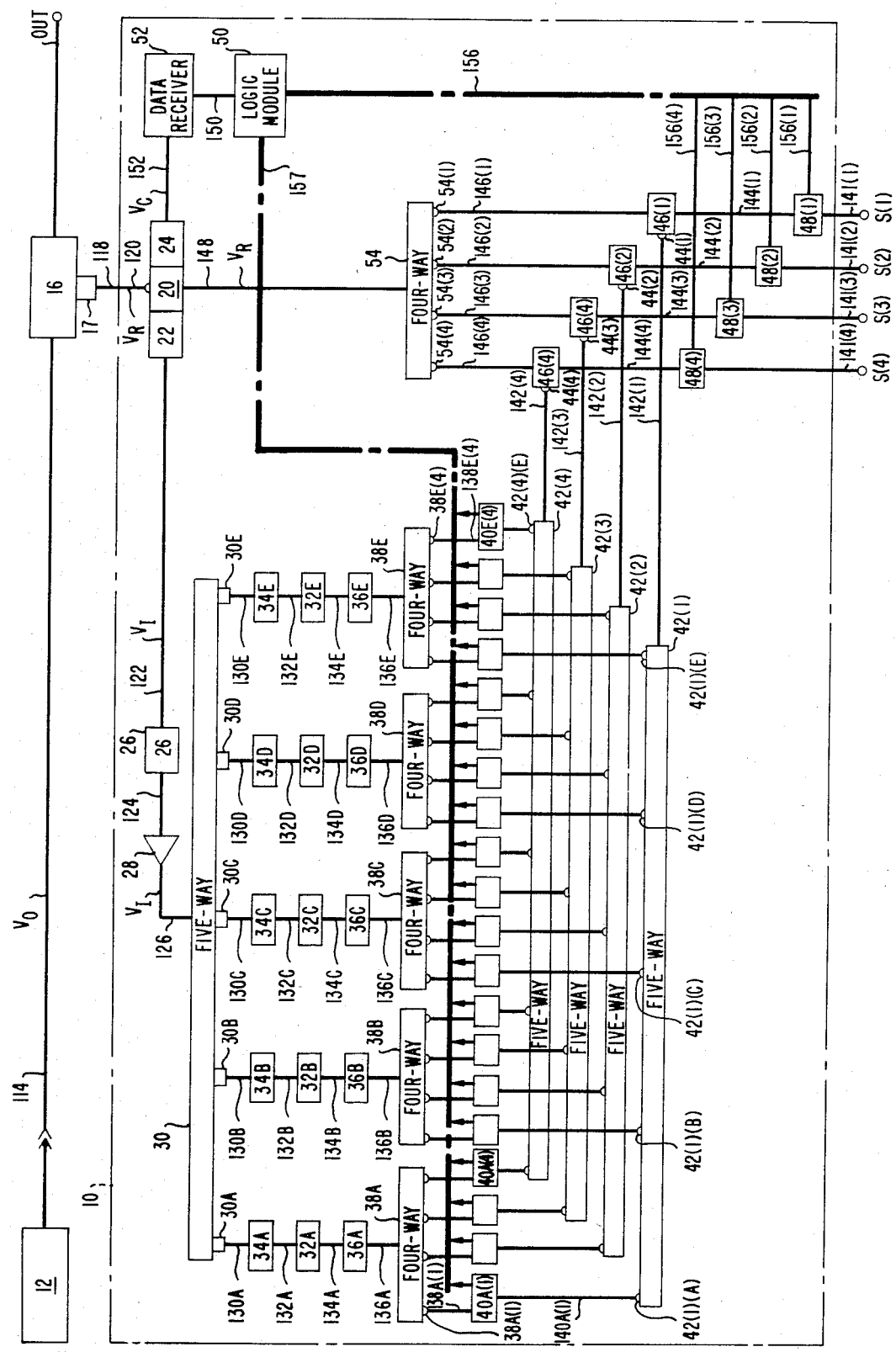
FIG. 5 is a block diagram serving to schematically illustrate another embodiment of the present invention.

Referring now to FIG. 5, there is shown a block diagram serving to schematically illustrate another embodiment of the present invention. The embodiment of the invention illustrated in FIG. 5 is adapted for applications of a television cable distribution system, having a substantial number of subscribers, and permits the nature of the service provided to subscribers already connected to the system to be remotely switched from the head end to thus accommodate varying needs of subscribers connected to the system without a requirement for a service call to a subscriber each time the service requested by that subscriber is modified. In order to simplify the description set forth, the embodiment of the invention illustrated in FIG. 5 has been shown within a system having a subloop for each group of four subscribers, and within such system there is provided a television distribution system wherein both basic and premium channel information is provided and selected access to up to each of five premium channels is contemplated. Those of ordinary skill in the art will appreciate, however, that in other applications, subloops involving more than four subscribers and/or systems involving more or less than five premium channels, may be readily accommodated according to the teachings of the instant invention through precisely the same techniques disclosed herein.

The embodiment of the invention illustrated in FIG. 5 discloses a multiple subscriber subloop 10 adapted to receive the composite cable signal $V_R$ from a main transmission line 14 through coupler 16. The main transmission line 114 is connected to a transmission station 12 located at the head end of the system in precisely the same manner described in connection with the embodiment of the invention illustrated in FIG. 1. Thus, the transmission center 12 represents a typical cable television transmission center where program material in the form of basic and premium channel information is propagated over a cable distribution network for reception at designated subscriber stations. The control center, in this case, is also equipped to transmit coded data in digital form over the same transmission cable 114 for purposes of selectively actuating switches within each subscriber subloop for controlling premium channel information provided to each subscriber in the subloop. While only a single coupler 16 and subscriber subloop 10 are illustrated in FIG. 5, those of ordinary skill in the art will appreciate that numerous couplers 16 may be serially connected to the main transmission line 114, in this case the terminal annotated OUT, and each such coupler 16 would have a separate subscriber subloop of the type indicated by the dashed block 10.

The coupler 16 is entirely conventional in design and should be viewed as an off-the-shelf item conventionally available in the marketplace. Thus, the coupler 16 may take the conventional form of a low loss coupler which effectively acts to apply a portion of the signal $V_O$ propagating on the transmission line 114 to the subloop 10 without substantial loss to the main signal on the transmission line 114. Furthermore, while not indicated in FIG. 5, it will be appreciated by those of ordinary skill in the art that in extensive distribution systems, the coupler 16 may be addressable by data issued from the transmission center 12.

The subscriber subloop indicated by the dashed block 10 comprises a coupler 20, bandpass filter 26, amplifier 28 and five-way splitter 30. The five-way splitter 30 includes five independent branches A–E, each of which is dedicated to one of the premium channels and each branch is terminated in a four-way splitter 38A–38E for providing one premium channel output for each subscriber to be served. Each of the four-way splitters 38A–38E is connected through switchable inputs to a plurality of combiners 42(1)–42(4) whose outputs are then combined with the main transmission signal $V_R$ and selectively supplied to the subscriber stations S(1)–S(4).

The coupler 20 takes the form of a conventional coupling device for receiving basic and premium channel information from the output of coupler 16 on the conductor 120 and applying the same through conductor 148 to a conventional four-way splitter 54 which acts, as shall be seen below, to provide basic and premium channel information to each of the subscribers S(1)–S(4). The coupler 20 is provided with tap 22 which again is conventional and serves to lightly tap the input signal $V_R$ to the coupler so that a replica of the basic and premium channel information on conductor 120 is also provided to the conductor 122, and hence, to the processing channels employed within the instant invention as shall be further described below. In addition, a second tap 24 is connected to the coupler 20 for decoupling encoded digital data transmitted from the transmission point 12 and supplying the same to the conductor 152 for use, in a manner to be described in greater detail below, for selectively actuating switches employed to selectively provide premium channel information to each of the subscribers S(1)–S(4).

The main channel information signal $V_R$ containing basic and premium channel information, as aforesaid, is provided from the coupler 20 through the conductor 148 to a four-way splitter 54. The four-way splitter 54 may, in all ways, take the conventional form of this well-known class of device and acts simply to divide the input signal $V_R$ into four corresponding signals and apply the same to conductors 146(1)–146(4) from the taps of the four-way splitter 54 indicated as 54(1)–54(4). The resulting $V_R$ signals present on the conductors 146(1)–146(4) are then supplied to corresponding subscriber couplers 46(1)–46(4) where such signal may be selectively combined with premium channel limiting information from the processing portion of this invention, as further described below, and thereafter supplied through the conductors 144(1)–144(4) and the corresponding digitally activated switches 48(1)–48(4) to the individual subscribers S(1)–S(4) on conductors 141(1)–141(4).

The signal information lightly tapped from the coupler 20 at tap 22 is applied through the conductor 122 to the bandpass filter 26. This information, as will be appreciated by those of ordinary skill in the art, corresponds to a replica of the basic and premium channel information $V_R$ which is also applied to the conductor 148. At this juncture, digitally encoded signal information present in the signal $V_O$, as applied to the transmission line 114, may also be present. Filter 26 may take the conventional form of a bandpass filter well known to those of ordinary skill in the art. The function of the bandpass filter 26 is to convey the entire spectrum of television channel information lightly tapped from the coupler 20 which includes both the basic and premium channel signals. Thus, the bandpass filter 26 will preferably have a pass band which extends from 50 MHz to 900 MHz corresponding to the regulated video band. For instance, the bandpass filter 26 may comprise a conventional Butterworth two-pole filter, or alternatively, other bandpass filters capable of accommodating this pass band may be employed.

The output of the bandpass filter 26 is connected through a conductor 124 to the amplifier 28. The use of filter 26 is optional and may be avoided if amplifier 28 exhibits sufficient linearity. The amplifier 28 may take precisely the same form of IC amplifier device described in connection with FIG. 1, or altnernatively, other conventional forms of this well-known class of device may be employed. Thus, it will be appreciated that the amplifier 28 acts to increase the level of the lightly tapped signal $V_1$ to a level corresponding to the signal $V_R$ which normally will have a magnitude of approximately 45 dB. The output of the amplifier means 28 is applied through the conductor 126 to the five-way splitter 30.

The five-way splitter 30 may take any of the conventional forms of this well-known class of device and, as was described in connection with FIG. 1, devices employing ferrite beads and having low insertion losses are preferred. As was further discussed above, the present embodiment assumes that the distribution system here under consideration provides, or at least makes provision, for selective switching of up to five premium television channels. Therefore, the function of the five-way splitter 30 is to divide the signal $V_I$ into five equal signals so that each signal includes representative signal information for all of the basic and premium channel information included within the signal $V_I$, and each such signal may be separately processed on the basic of the single premium channel associated with an individual branch of the five-way splitter 30.

The five-way splitter is provided with five discrete outputs, as indicated 30A-30E, and each output forms the initial portion of a branch of the processing network assigned to a predetermined premium television channel signal. For ease of identification and discussion, it may be assumed that the five premium channels are designated with the letters A-E and that each channel is processed in a branch bearing the annotation letter associated therewith.

Each of the five outputs of the five-way splitter 30 is connected to a particular processing branch A-E assigned to the particular premium channel signal being processed. Furthermore, each such processing branch includes each of the same elements with the single exception that the characteristics of the elements involved are centered on the center frequency for the premium television channel being processed. Thus, each of the five branches A-E includes a modulator 34A-34E, a narrow band filter 32A-32E, and a phase shifter 36A-36E for imparting a resulting 180 degree phase shift to the access limiting premium channel signal being processed.

Each of the modulators 34A-34E may take the form of an amplitude modulating device which, in preferred form, is tuned to the center frequency $f_O$ of the premium television channel information being processed. While any conventional form of this well-known class of device could be used, and in fact phase or angle modulation could be substituted for the amplitude modulating device being described herein, a preferred form of modulator which may be employed for purposes of the modulators 34A-34E shall be described below in connection with FIG. 6. Therefore, it is here sufficient to appreciate that each of the modulators 34A-34E are specifically tuned to the center frequency of the premium television signal associated with the branch in which it resides and serves to amplitude modulate the $V_I$ signal supplied to that branch from its associated output of the five-way splitter 30.

The output of the modulators 34A-34E within each of the branches A-E is applied through a respective one of the conductors 132A-132E to a narrow band filter 32A-32E resident within the individual branch. Each of the filters 32A-32E may again take the form of a surface acoustic wave (saw) resonant filter of the type described in connection with FIG. 1 having its center pass frequency at the center frequency of the premium television channel associated with that branch and having a bandwidth of approximately 100 KHz. Alternatively, other conventional forms of filter devices may be employed and again the bandwith may extend to 3 MHz. However, it should be noted that each of the filters 32A-32E could exhibit a sharply defined notch characteristic so that interference with adjacent channels is avoided.

The output of each of the narrow band filters 32A-32E is applied through the respective conductors 134A-134E within that branch to its associated phase shifter 36A-36E. Each of the phase shifters 36A-36E may be conventional devices of precisely the same form as described in connection with FIG. 1 and act as aforesaid to insert a 180 degree phase shift in the signal being processed so that when such signal is reintroduced to the composite signal $V_R$ being supplied to the subscribers, cancellation will operate in the manner described in connection with FIG. 2. However, it should be noted, and those of ordinary skill in the art will appreciate, that if the components within the processing loop are carefully selected so that the overall phase shift inserted by various elements within the loop tend to cancel, conventional IC inverter devices may be employed in place of the phase shifter devices 36A-36E. Those of ordinary skill in the art will further appreciate that where inverters are employed in place of the phase shifters 36A-36E, conventional IC inverters may be utilized. Furthermore, those of ordinary skill in the art will additionally appreciate that should it be found necessary to insert additional lead or lag within a given branch, the same may be injected through fine tuning procedures as well known to those of ordinary skill in the art.

From the foregoing, it will be seen that each of the five branches A-E provided at the outputs of the five-way splitter means 30 act initially to modulate the composite signal supplied thereto, and thereafter, through use of the narrow pass band filter 32A-32E to remove all basic and premium channel components except the premium channel component signal associated with that branch. Thereafter, the resulting premium television channel signal component which has been modulated is inverted by 180 degrees and provided at the output of each of the branches A–E.

The output of each of the branches A–E is connected through a respective one of the conductors 136A–136E to an individual four-way splitter 38A–38E. Each of the four-way splitters 38A–38E may be a conventional four-way splitter device; however, it again should be noted that a low loss ferrite bead type splitter configuration is preferred. The purpose of each of the four-way splitters 38A–38E is to provide a channel access limiting signal associated with its particular branch for each of the four subscribers to be serviced from the subloop indicated by the dashed block 10. To this end, each of the four-way splitters 38A–38E provides four outputs on the conductors generally indicated as 138(1)–138A(4) through 138E(1)–138E(4).

Each of the four outputs of the four-way splitters 38A–38E are connected to an individual switch means 40A(1)–40A(4) through 40E(1)–40E(4) associated therewith. Each of the switch means is preferably an electronically actuated switch capable of supplying the signal present at the input thereto to the output thereof when the same has been gated on by a gating signal supplied to a gating input thereof, as generally indicated by the arrows shown in the upper right-hand corner of each of the switches. Each of the electronically actuated switch means may take any of the conventional forms of this well-known class of device, for instance, bipolar transistors, SCR's, optoelectric isolators or conventional IC devices directed to similar functions may be employed. While the trigger electrodes of these devices have been generally indicated by the arrows, to avoid undue drawing complexity, it will be appreciated that each of such arrows represent a conductor and that, as shall be seen below, each of these conductors are individually connected to associated ones of the outputs of the logic module 50 bearing the annotation "To Switches 40A(1) to 40E(4)". Those of ordinary skill in the art will appreciate that whenever one of those switches are commonly addressed by the logic module, the same will be rendered conductive or non-conductive and retain this state until the same is subsequently addressed by a different control signal.

The output of each of the switch means 40A(1)–40E(4) is supplied to four five-way combiners 42(1)–42(4). The five-way combiners are conventional devices which act in a complimentary mode to a splitter, and hence, to combine independent video signals supplied thereto into a single resultant signal. The function of each of the four-way combiners 42(1)–42(4) is to combine each premium channel access limiting signal developed by each of the branches A–E into a resulting signal which then may be applied to each of the four subscribers. Thus, assuming all of the switches 40A(1)–40E(4) are in an on or closed condition, each of the four five-way combiners 42(1)–42(4) will receive five premium channel access limiting signals, each of which was developed by one of the branches A–E so that such combined signal may be mixed with the signal $V_R$ supplied to each of the four subscribers S(1)–S(4).

The output of each of the five-way combiners 42(1)–42(4) is supplied through an associated one of the conductors 142(1)–142(4) to an associated one of the couplers 46(1)–46(4) associated with each of the subscribers. The couplers 46(1)–46(4) may take any of the well-known forms of this conventional class of device such as the coupler 44 illustrated and described in connection with FIG. 1. Alternatively, a separate coupler and input tap could be employed.

The couplers 46(1)–46(4) thus receive, at the inputs thereto annotated 44(1)–44(4), a composite signal corresponding to a combined output of branches A–E which corresponds to modulated and inverted premium channel access limiting signals associated with each premium television channel. Additionally, the couplers 46(1)–46(4) receive from the output of the four-way splitter 54, as aforesaid, the resultant signal $V_R$ which corresponds to all basic and premium channel information which may be supplied to any subscriber S(1)–S(4). The summation of these two signals is then supplied through the conductors 144(1)–144(4) to one input of the switch means 48(1)–48(4).

The switch means 48(1)–48(4) again take the form of electronically actuated switches capable of passing an analog signal, and hence, may take any of the forms described in connection with the switches 40A(1)–40E(4). In this case, the control lines to the gates of each switch are illustrated as conductors 156(1)–156(4). Thus, those of ordinary skill in the art will appreciate that whenever a gating signal has been supplied to respective ones of the switches 48(1)–48(4), such switch will be placed in an enabled condition to apply the composite of the signal $V_R$ containing basic and premium channel information, as well as any premium channel access limiting information supplied to the coupler 46(1)–46(4) to an individual one of the subscribers S(1)–S(4). Accordingly whether a particular subscriber receives any information is determined by the condition of the switch means 48(1)–48(4), and if such information is received, the amount of premium channel information that a particular subscriber is provided with will vary as a function of the settings of the switch means 40A(1)–40E(4).

The individual switches 48(1)–48(4) and the switches 40A(1)–40E(4) are controlled by individual outputs of the logic module 50. As was earlier described, digital switching information is supplied from the head end by encoding of such information with the basic and premium channel information applied to the transmission line 114 from the transmission center 12. In an exemplary embodiment of the invention which was built and tested, the digital switching information supplied took the form of frequency shift keyed digital information encoded with the video and periodically supplied to the line. Under these circumstances, this information is supplied from the coupler 20 through the tap 24 and line 152 to a data receiver 52. While any data receiver 52 could be employed, under the conditions here being discussed, an FSK type receiver such as a Motorola MC3356 device would be employed. Typically, such an FSK receiver would include an oscillator, mixer, limiting IF amplifier, quadrature detector, data shaper comparator and the like so that FSK encoded data received thereby would be output therefrom in the form of digitally encoded data suitable for direct application to a microprocessor or the like.

The output of the data receiver is provided through the cable 150 to the input of the logic module 50. The logic module 50 may comprise any of the conventional forms of processor or controllers conventionally available and capable of receiving digital information, decoding the same, and outputting discrete control signals as a result thereof at the outputs therefrom annotated 156–157. Other attributes of the logic module 50 should include onboard ROM to facilitate appropriate address decoding, as well as RAM and appropriate driver stages. Additionally, the logic module selected should be relatively inexpensive. For example, the logic module 50 may comprise an 8-bit microprocessor such as an MC1468705G2 unit available from Motorola. This particular microprocessor is user programmable and contains ROM, EPROM, RAM and 32 bidirectional I/O lines. The particular microprocessor unit is also viewed as highly advantageous in that its I/O lines are buffered, and hence, the same is capable of maintaining predetermined gating inputs for each of the switches being controlled thereby until new data is supplied from the central transmitting location 12. Typically, refresh by way of the submission of new FSK data occurs at three minute intervals or less.

In operation of the embodiment of the invention illustrated in FIG. 5, basic and premium channel information, as well as FSK switching data, is supplied from the central transmission 12 through the transmission cable 114 to the coupler 16. This information will be further coupled from the output thereof to succeeding distribution subloops, as aforesaid, and through the tap 17 to the distribution subloop indicated by the dashed block 10.

The information supplied from the tap 17 is coupled through the coupler 20 and the conductor 148 through the four-way splitter to the couplers 46(1)–46(4). Additionally, the FSK digital switching information is supplied through tap 24 and conductor 152 to the data receiver 52. The data receiver 52 decodes the FSK information which is present and supplies the same through the cable 150 to the logic module 50. The logic module 50 receives this information on a periodic basis, and each time such information is received, provides discrete outputs on conductors 156 and 157 to set the switches 48(1)–48(4) and 40A(1)–40E(4). Those of ordinary skill in the art will appreciate that if any of the switches 48(1)–48(4) are placed in an open condition, the subscribers S(1)–S(4) associated therewith receives no information from the cable of any sort, and this includes both basic and premium channel information. However, if the switches 48(1)–48(4) are in a closed condition, the subscribers S(1)–S(4) will receive all basic channel information and such premium channel information as is determined by the setting of the switches 40A(1)–40E(4).

The basic and premium channel information supplied to the coupler 20 is lightly tapped and supplied through the conductor 122 to the bandpass filter 26 which preferably acts in the well-known manner to filter out all non-video information. Thereafter, the resulting signal is applied through the conductor 124 to the amplifier 28 where the level thereof is increased to correspond to that of the signal $V_R$. The resulting basic and premium information is supplied through the conductor 126 to the five-way splitter 30 wherein the same is divided in five individual branches A–E. In each branch, the resulting signal received is initially modulated by the modulator means 34A–34E associated with that branch, and thereafter, the modulated signal propagating in that branch is further limited by the narrow band filter 32A–32E specifically to the premium channel associated with that branch. Thereafter, the limited premium channel signal is inverted by the phase inverter 36A–36E and split into four independent signals by the four-way splitters 38A–38E associated with each branch. At this juncture, one premium channel access limiting signal for each premium channel and for each subscriber is available at the outputs of the five four-way splitters 38A–38E.

The setting of the switch means 40A(1)–40E(4) determine what premium channel information an individual subscriber is to receive. Thus, one output from each of the four-way splitters 38A–38E may be coupled through a respective one of the switch means 40A(1)–40E(4) to one of the five-way combiners 42(1)–42(4) associated with a particular subscriber S(1)–S(4). Thus, for instance, if the S(1) subscriber was to receive no premium channel information, each of the switches 40A(1), 40B(1) . . . 40E(1) associated with the five-way combiner 42(1) would be placed in a closed condition so that the premium channel limiting signal associated with each branch would be supplied to the combiner 42(1) and a resulting signal therefrom supplied to the coupler 46(1). Those of ordinary skill in the art will appreciate that various combinations of the switches 40A(1)–40E(4) in opened and closed states will insure that any particular subscriber S(1)–S(4) may receive all or no premium channel information or any combination of the five premium channels provided.

Thus, the coupler 46(1)–46(4) associated with a particular subscriber S(1)–S(4) receives all the basic channel information contained in the signal $V_R$ and such premium channel signal information as is not cancelled and otherwise foreclosed by the input to that coupler supplied through one of the conductors 142(1)–142(4). Hence, information provided to each of the subscribers S(1)–S(4) is discretely controlled as a function of the settings of the switches 48(1)–48(4) and 40A(1) and 40E(1).

Figure 6:
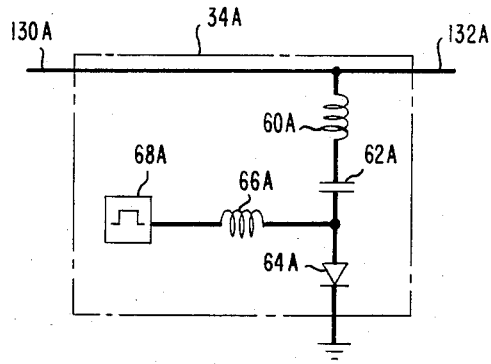
FIG. 6 is a block diagram illustrating an exemplary modulator circuit which may be employed in the embodiment of the invention shown in FIG. 5.

Referring now to FIG. 6, there is shown a block diagram showing an exemplary modulator circuit which may be employed in the embodiment of the invention shown in FIG. 5. The modulator circuit illustrated in FIG. 6 is shown connected between the conductors 130A and 132A so as to render apparent the manner in which the same would interconnect within the A branch of the embodiment illustrated in FIG. 5. The modulator generally indicated by the dashed block 34A in FIG. 6 comprises a filter formed by the inductor 60A and capacitor 62A, a pulse source indicated by the block 68A, a choke 66A and a diode 64A. The inductor 60A and the capacitor 62A are connected in series to form a conventional LC filter, although other well-known filter combinations can be employed as well. The filter formed by the inductor 60A and the capacitor 62A is tuned to the center frequency $f_O$ of the premium channel for the branch A–N in which the modulator resides. Thus, if it is assumed that the modulator depicted in FIG. 6 resides in the A branch, the LC filter formed by the inductor 60A and the capacitor 62A would be tuned to the frequency $f_O$ of the A channel.

The pulse source 68A is a conventional timing source to provide the 15.750 KHz or off frequency modulating signal and may be provided from a conventional 555 timing IC chip or from any other conventional generator chip well-known to those of ordinary skill in the art. Furthermore, a common pulse source may be employed for all modulators employed. The output of the pulse source 68A is connected through an inductor 66A which may take the form of a conventional RF choke to the junction between the output of the filter formed by the inductor 60A and the capacitor 62A and the anode of the diode 64A. The diode 64A may take any of the conventional forms of this well-known class of device typically used in modulator configurations. For instance, a PIN diode may be employed.

In operation of the modulator circuit illustrated in FIG. 6, it will be appreciated that the input thereto on conductor 130A would be selectively modulated by the filter formed by the inductor 60A and the capacitor 62A so that approximately 1.2 dB modulation is applied to the premium channel information carrier associated with the A branch as a function of the characteristics of the filter formed. The signal passed to the junction between terminals 130A and 132A and inductor 60A is periodically shorted to ground by applied voltage from the pulse source 68A to the annode of diode 64A. Those of ordinary skill in the art will apprciate that as the anode of the diode 64A is shorted to ground at a rate of 15.750 KHz, corresponding at the output of the pulse generator 68A, modulation of the carrier will occur in a manner well known to those of ordinary skill in the art. The modulated output signal is applied to the conductor 132A where it is processed in the manner described in connection with FIG. 5. While a particular form of modulator circuit has been illustrated in FIG. 6, those of ordinary skill in the art will appreciate that other forms of modulators may be readily employed without deviating from the concepts of the instant invention.

While the present invention has been described in connection with several specific embodiments thereof, those of ordinary skill in the art will readily appreciate that many modifications and variations may be made to suit specific design applications and that such modifications and variations will widely vary as a function of choice of design, as well as the characteristics of signal information to be processed thereby. Furthermore, those of ordinary skill in the art will appreciate that while specific circuit configurations have been disclosed for purposes of setting forth a full and complete description, wide variations in the use of specific devices and frequencies mentioned are readily available. Furthermore, actual structuring of the system may be varied as a direct function of the nature of the subscriber service to be provided and the number of subscribers to be served.

While the present invention has been described in connection with rather specific preferred embodiments thereof, it will be understood that many modifications and variations will be readily apparent to those of ordinary skill in the art and that this application is intended to cover any adaptation or variations thereof. Therefore, it is manifestly intended that this invention be only limited by the claims and the equivalents thereof.

What is claimed is:

1. Secure cable television distribution apparatus for regulating access to channel information at a subscriber station, comprising:
   means for receiving said channel information and for applying said channel information to a subscriber station;
   means for obtaining signal information representing at least one predetermined channel signal in said channel information;
   means for inserting a phase shift substantially equal to 180 degrees into said signal information; and
   means for selectively combining said phase-shifted signal information and said channel information applied to said subscriber station to selectively defeat access to said at least one predetermined channel signal at said subscriber station.

2. The apparatus according to claim 1 additionally comprising means for amplifying said signal information.

3. The apparatus according to claim 1 additionally comprising means for modulating said signal information.

4. The apparatus according to claim 3 wherein said means for modulating modulates said signal information at a rate substantially corresponding to 15.750 KHz.

5. The apparatus according to claim 2 wherein said means for amplifying the gain of said signal information to substantially correspond to the magnitude of said channel information.

6. The apparatus according to claim 3 additionally comprising means for amplifying said signal information.

7. The apparatus according to claim 6 wherein said means for modulating modulates said signal information at a rate substantially corresponding to 15.750 KHz.

8. The apparatus according to claim 1 wherein said means for obtaining includes splitter means, said splitter means producing a plurality of outputs corresponding to the number of predetermined channel signals to which access may be selectively defeated.

9. The apparatus according to claim 1 wherein said means for obtaining includes filter means having a pass band corresponding to said at least one predetermined channel signal.

10. The apparatus according to claim 9 wherein said filter means takes the form of a surface acoustic wave resonant filter.

11. The apparatus according to claim 6 wherein said means for obtaining includes filter means having a pass band corresponding to said at least one predetermined channel signal.

12. The apparatus according to claim 11 wherein said filter means takes the form of a surface acoustic wave resonant filter.

13. The apparatus according to claim 7 wherein said means for obtaining includes filter means having a pass band corresponding to said at least one predetermined channel signal.

14. The apparatus according to claim 13 wherein said filter means takes the form of a surface acoustic wave resonant filter.

15. Secure cable television distribution apparatus for regulating access to channel signals at a subscriber station comprising:
   means for receiving signal information representing base channel signals and premium channel signals and for applying said signal information to said subscriber station;
   means for obtaining an input representative of said signal information;
   means for modulating said input;
   means for inserting a phase shift substantially equal to 180 degrees into said input;
   meas for filtering said input and passing selected premium channel signals; and
   switch means for selectively applying desired ones of said selected premium channel signals, phase-shifted and modulated, to said subscriber station to defeat access to said selected ones of said premium channel signals at said subscriber station.

16. The apparatus according to claim 15 further comprising means for amplifying said input to cause the magnitude of said input to substantially correspond to the magnitude of said signal information applied to said receiving means.

17. The apparatus according to claim 15 wherein said modulating means modulates said input at a rate of approximately 15.750 KHz.

18. The apparatus according to claim 15 wherein said filter means further comprises means for narrowing the bandwidth of said passed signals to at least 3 MHz.

19. The apparatus according to claim 18 wherein said filter means comprises at least one surface acoustic wave resonator.

20. The apparatus according to claim 15 further comprising splitter means for dividing said input into a plurality of channel signals and for applying said plurality to said filter means.

21. The apparatus according to claim 15 wherein said switch means comprises at least one remotely actuable electronic switch.

22. The apparatus according to claim 21 further comprising combiner means for applying to said subscriber station said desired ones of signals, phase-shifted and modulated, as a composite signal.

23. The apparatus according to claim 15 wherein said means for obtaining comprises means for lightly tapping said means for receiving for obtaining said input.

24. Secure cable television distribution apparatus for regulating access to channel signals at subscriber stations comprising:
  means for receiving signal information representing base channel signals and premium channel signals and for applying said signal information to a number of subscriber stations;
  means for obtaining an input representative of said signal information;
  meas for splitting said input into a plurality of branch signals, each of said plurality of branch signals corresponding to individual premium channel signals to be controlled;
  meas for modulating each of said branch signals;
  means for limiting the content of each of said branch signals substantially to an individual premium channel signal associated therewith;
  means for inserting a phase shift corresponding to a resulting 180 degree phase shift into each of said branch signals;
  means for establishing a number of composite access limiting signals from said branch signals, each composite access limiting signal being formed of selected ones of said modulated, limited and phase shifted branch signals, said number of composite access limiting signals corresponding to said number of subscriber stations; and
  means for selectively applying each of said number of composite access limiting signals to corresponding ones of said number of subscriber stations to selectively defeat access to predetermined ones of said premium channel signals at said subscriber stations.

25. The apparatus according to claim 24 wherein said means for establishing a number of composite access limiting signals comprises:
  a plurality of splitters, each of said plurality of splitters receiving a differing one of said modulated, limited and phase shifted branch signals, each of said plurality of splitters dividing the branch signal received thereby into a number of branch signals corresponding to said number of subscriber stations; and
  a number of combiner means corresponding to said number of subscriber stations, each of said combiner means for receiving one branch signal from each of said plurality of splitters and combining each of said branch signals received into a composite access limiting signal for a corresponding one of said number of subscriber stations.

26. The apparatus according to claim 25 additionally comprising switch means interposed between said plurality of splitters and said number of combiner means, said switch means for controlling the application of each branch signal from each of said plurality of splitters to each of said number of combiner means.

27. The apparatus according to claim 26 wherein said switch meas comprises a group of individual electronically controlled switches, each switch in said group controlling the application of one branch signal from one of said plurality of splitters to one of said number of combiner means.

28. The apparatus according to claim 27 wherein subscriber switching information is encoded with said signal information.

29. The apparatus according to claim 28 additionally comprising means for decoding subscriber switching information encoded with said signal information, said means for decoding additionally providing control signals to each of said individual electronically controlled switches to control the state thereof.

30. The apparatus according to claim 29 wherein said subscriber switching information is FSK encoded and said means for decoding comprises an FSK receiver and a processor responsive to switching information decoded by said FSK receiver to provide said control signals.

31. The apparatus according to claim 24 wherein said means for receiving and applying comprises a number of individual electronically controlled switch means for selectively applying basic and premium channel signals to corresponding ones of said number of subscriber stations.

32. The apparatus according to claim 31 wherein subscriber switching information is encoded with said signal information.

33. The apparatus according to claim 32 additionally comprising means for decoding subscriber switching information encoded with said signal information, said means for decoding additionally providing control signals to each of said individual electronically controlled switch means to control the state thereof.

34. The apparatus according to claim 33 wherein said subscriber switching information is FSK encoded and said means for decoding comprises an FSK receiver and a processor responsive to switching information decoded by said FSK receiver to provide said control signals.

* * * * *

UNITED STATES PATENT AND TRADEMARK OFFICE
CERTIFICATE OF CORRECTION

PATENT NO. : 4,598,312
DATED : July 1, 1986
INVENTOR(S) : Geissler, et al

It is certified that error appears in the above-identified patent and that said Letters Patent is hereby corrected as shown below:

```
Column  3, line 31, "combined" should read --combiner--.
Column 13, line 54, "four-way" should read --four five-way--.
Column 18, line 58, "meas" should read --means--.
Column 19, line 35, "meas" should read --means--.
Column 19, line 39, "meas" should read --means--.
Column 20, line 20, "meas" should read --means--.
```

The reference numerals at the end of each of the following columns and lines should not be hyphenated:

> Column 13, lines 19;
> 48;
> 58;
>
> Column 14, line 21; and
>
> Column 16, line 7.

Signed and Sealed this

Eleventh Day of November, 1986

Attest:

DONALD J. QUIGG

Attesting Officer     Commissioner of Patents and Trademarks